United States Patent [19]

Inaba

[11] Patent Number: 4,531,034
[45] Date of Patent: Jul. 23, 1985

[54] KEY SWITCH DEVICES WITH INDICATOR LAMP MEANS

[75] Inventor: Hiroshi Inaba, Kawasaki, Japan

[73] Assignee: Nitsuko Limited, Kawasaki, Japan

[21] Appl. No.: 591,788

[22] Filed: Mar. 21, 1984

[30] Foreign Application Priority Data

Mar. 24, 1983 [JP] Japan .............................. 58-41283[U]
May 2, 1983 [JP] Japan .............................. 58-66757[U]

[51] Int. Cl.³ .............................................. H01H 9/16
[52] U.S. Cl. ..................................... 200/314; 200/317
[58] Field of Search ............... 200/5 A, 310, 313, 314, 200/317

[56] References Cited

U.S. PATENT DOCUMENTS 3,811,025 5/1974 Bach ..................................... 200/317
4,376,879 3/1983 Nagata et al. ........................ 200/314

FOREIGN PATENT DOCUMENTS 17580 10/1980 European Pat. Off. ............ 200/314
2065373A 6/1981 United Kingdom .

Primary Examiner—John W. Shepperd
Attorney, Agent, or Firm—Roberts, Spiecens & Coheb

[57] ABSTRACT

A key switch device having a plurality of keys and a plurality of light emission diode tips for indicating the keys operated, respectively. The diode tips are mounted and electrically connected to metal patterns formed on the same surface of a printed circuit on which fixed contact pairs are formed. In order to cover the diode tips, a transparent plate is overlaid on the printed circuit board and has lamp cover portions. The transparent plate is also provided with small upwardly opening funnel shaped slits at positions between adjacent lamp cover portions, whereby light from one light emission diode is prevented from leaking to a lamp cover corresponding to the adjacent light emission diode.

4 Claims, 7 Drawing Figures

KEY SWITCH DEVICES WITH INDICATOR LAMP MEANS

BACKGROUND OF THE INVENTION

1. Field of the Invention

The present invention relates to key switches with indicator lamp means for indicating an operated key.

2. Description of the Prior Art

Such a key device with indicator lamp means is used, for example, for selection key switches, such as office-line selection keys, extension line selection keys, hold keys or the like in a key telephone set.

A known key switch with indicator lamp means includes an insulator housing plate having an opening and an electric circuit board stationarily disposed inside the housing plate. A key is slidably fitted in the opening and is elastically supported therein. The key can be pushed down to the circuit board against the elastic support. The key is accompanied with a movable contact which moves together with the key. The circuit board has a pair of fixed contacts formed on its upper surface. The pair of fixed contacts is closed or connected with one another by the movable contact when the key is pushed down so that the movable contact comes into contact with the fixed contacts. In the vicinity of the pair of fixed contacts, a light emission diode device is mounted on the circuit board.

The circuit board is connected with an external control circuit (not shown) so that when the key is pushed down, the light emission diode device is energized or luminesces for indicating the operated key.

In the known key switch, the light emission diode device is used as an indicator lamp means, and is disposed in a space between the housing plate and the circuit board. Therefore, the space is determined by the size of the light emission diode device so that it is impossible to reduce a thickness or height of the key switch device.

Further, the circuit board must have through holes for receiving the leads of the light emission diode device and metal patterns on the bottom surface for soldering the leads thereto. Therefore, the circuit board is required to have metal patterns on both surfaces.

SUMMARY OF THE INVENTION

An object of the present invention is to provide a key switch device with indicator lamp means which is reduced in height or the thickness.

Another object of the present invention is to provide a key switch device with indicator lamp means wherein the electric circuit board used therein is not required to have printed metal patterns on both surfaces.

Still another object of the present invention is to provide a key switch device having a plurality of keys and indicator lamp means corresponding to respective keys wherein the light of a luminescing indicator lamp means is prevented from leaking to the adjacent keys.

As described above, a key switch device with an indicator lamp means includes a housing plate and an electric circuit board having a pair of fixed contacts disposed on the upper surface thereof. An indicator lamp means is disposed above and spaced from the electric circuit board. A key is slidably fitted into an opening of the housing plate and is elastically supported. A movable contact is accompanied with the key and comes into contact with the pair of fixed contacts when the key is pushed down. According to the present invention, a light emission diode tip is used as the indicator lamp means. The light emission diode tip is mounted on the circuit board and is electrically connected to the printed circuit on the circuit board. A lamp cover means is mounted on the electric circuit board for covering the light emission diode tip. The lamp cover means is formed of a light transparent material.

In one aspect of the present invention, the key switch device includes a plurality of sets of the key, the movable contact, the pair of fixed contacts and the light emission diode tip. The pairs of fixed contacts and the light emission diode tips are mounted on a single circuit board. The lamp covers for the plurality of light emission diode tips are formed integral with one another to be a single body, which is overlaid on the circuit board. The single cover member is provided with a plurality of openings or slits at positions between adjacent lamp cover portions. Each slit is formed in a funnel shape which is open upwardly. The slit serves to prevent the light emitted from one light emission diode tip from leaking to an adjacent lamp cover portion.

Furhter objects, features and other aspects of the present invention will be understood from the following description of preferred embodiments referring to the accompanying drawings.

DETAILED DESCRIPTION OF PREFERRED EMBODIMENTS

Before to describing the embodiments of the present invention, the prior art will be described below.

Figure 1:
FIG. 1 is a perspective view of a key telephone set according to the prior art using a key switch device with indicator lamp means.

Referring to FIG. 1, a key switch device with indicator lamp means is used, for example, in a key telephone set 1, as shown at 2. The key switch device 2 is provided with a plurality of keys which are used, for example, for several office-line selection keys, extension line selection keys, hold keys and other function keys.

Figure 2:
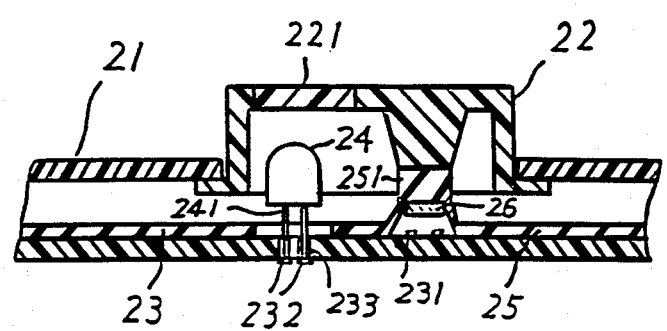
FIG. 2 is a sectional view of a portion of a known key device with indicator lamp means.

Such a key switch with indicator lamp means will be described referring to FIG. 2, illustrating a portion of a key switch.

Referring to FIG. 2, an insulator housing plate 21 has an opening 211 for receiving a key 22. Key 22 is slidably fitted into opening 211. A printed electric circuit board 23 is stationarily disposed inside, and spaced from, housing plate 21. Printed circuit board 23 has a pair of fixed contacts 231 on the upper surface thereof. A light emission diode device 24 is also mounted on the upper surface of board 23 in the vicinity of the pair of fixed contacts 231. The printed circuit board 23 has through holes 232 for receiving leads 241 of light emission diode device 24, and backside metal patterns 233 for soldering the leads thereto. A rubber sheet 25 overlies the upper surface of printed circuit board 23, and is provided with an arch portion 251 which projects in an arcuate form over the fixed contacts 231. Arch portion 251 is in press-contact with a bottom portion of key 22 and urges key 22 upwardly. Arch portion 251 is provided with a movable contact 26 on the inner surface thereof. Accordingly, when key 22 is pushed down against the elastic support provided by arch portion 251, movable contact 26 comes into contact with fixed contacts 231 and connect them with one another. Accordingly, a turn-on signal is applied to an external control circuit (not shown) connected to printed circuit board 23, and light emission diode device 24 is energized and luminesces under control of the control circuit.

Key 22 is provided with an indicator window 221 and the light from the luminescing light emission diode device 24 is visible through indicator window 221 to indicate that the key 22 is operated.

In the known key switch device, since light emission diode device 24 is used for indicator lamp means, the space between housing plate 21 and circuit board 23 cannot be reduced because of the comparative large size of light emission diode device 24. Therefore, a thinner key switch device cannot be obtained.

According to the present invention, instead of a light emission diode device a light emission diode tip is used as the indicator lamp means, and a thinner key switch device can be obtained.

Figure 3:
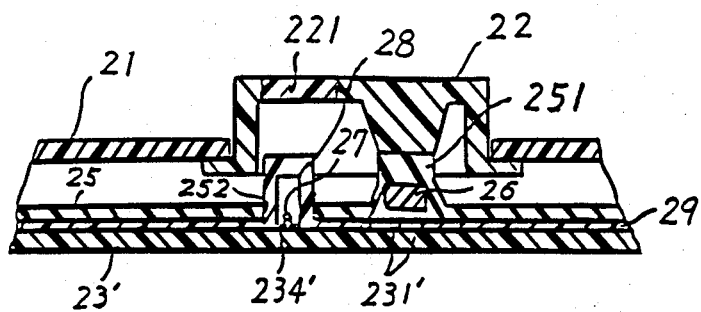
FIG. 3 is a sectional view of a portion of an embodiment according to the present invention.

Referring to FIG. 3, an embodiment of a key switch device according to the present invention is generally similar to the key switch device of FIG. 2 except the following arrangements as described hereinbelow. The similar parts are represented by the same reference numerals in FIG. 2. Detailed description of those similar parts is omitted for purpose of simplification of the description.

In the embodiment shown in FIG. 3, a light emission diode tip 27 is used in place of the light emission diode device 24 in FIG. 2. A printed circuit board 23' is provided with a pair of fixed contacts 231' but lacks through holes 232 and backside metal pattern 233 of FIG. 2. Printed circuit board 23' has a metal pattern on the upper surface thereof to which light emission diode tip 27 is electrically connected by soldering.

Since light emission diode tip 27 is substantially smaller than the light emission diode device 24, the space between housing plate 21 and printed circuit board 23' can be reduced.

A lamp cover 28 is disposed to protect light emission diode tip 27 and to scatter the light from the diode tip 27. In the embodiment shown, a light transparent plate 29 of a plastic resin, for example, epoxy resin is disposed between printed circuit board 23' and rubber sheet 25. Lamp cover 28 is formed as a partial projection of light transparent plate 29. The projection has a hollow space in which light emission diode tip 27 is disposed.

Lamp cover 28 extends through an opening 252 in rubber sheet 25 so that light emitted from light emission diode tip 27 passes through lamp cover 28 and is scattered thereat and emitted through indicator window 221.

In order to insure that movable contact 26 comes into contact with fixed contact pair 231', transparent plate 29 is provided with a hole or opening 291 to expose the fixed contact pair.

Figure 4:
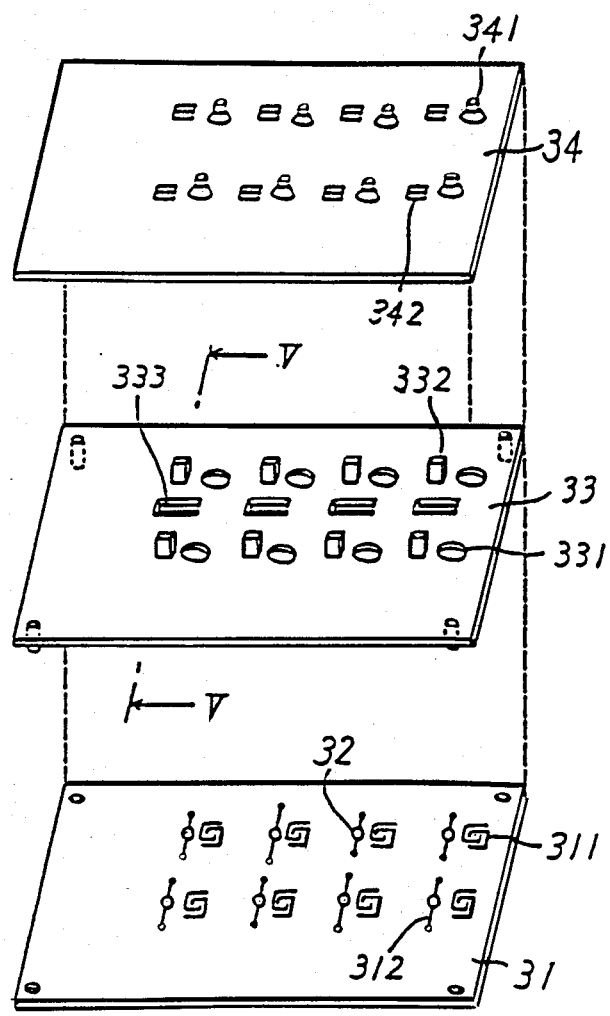
FIG. 4 is a perspective view of disassembled main parts of another embodiment according to the present invention.

Referring to FIG. 4, another embodiment is shown therein which is provided with a plurality of keys. It should be noted that the housing plate and the keys are omitted for purpose of simplification of the drawing. However, it will be understood that those keys are slidably fitted respective openings of the housing plate, in a similar manner as in FIG. 3.

A printed circuit board 31 is provided with a plurality of pairs of fixed contacts 311 at predetermined positions thereon. A plurality of light emission diode tips 32 are mounted and electrically connected to metal patterns 312 which are disposed in the vicinity of respective pairs of fixed contacts 311.

Printed circuit board 31 is provided with terminals for connection with an external electric circuit, and wiring patterns for connecting the terminals with respective metal patterns 312 and respective fixed contact pairs 311. However, those terminals and wiring patterns are not shown for purpose of simplification of the drawing.

A light transparent plate 33 is overlaid onto printed circuit 31. Transparent plate 33 is provided with a plurality of holes 331 for exposing respective fixed contact pairs 311, and a plurality of lamp covers 332 for covering respective light emission diode tips 32. Transparent plate 33 is formed with a plurality of openings or slits 333 in positions between adjacent lamp covers 332.

On light transparent plate 33, a rubber sheet 34 is overlaid. Rubber sheet 34 is provided with a plurality of arch portions 341 at positions corresponding to fixed contact pairs 311, respectively. Each arch portion 341 is similar to arch portion 251 in FIG. 3 and has a movable contact (not shown) on the inner surface thereof. Rubber sheet 34 further has a plurality of openings 342 for receiving lamp covers 332 of transparent plate 33.

After superposing printed circuit board 31, transparent plate 33 and rubber sheet 34, a housing plate having a plurality of keys is mounted on the superposed body so that a key switch device laving a plurality of key switches is assembled. One key switch portion of the assembled device has a sectional view similar to in FIG. 3.

Figure 5:
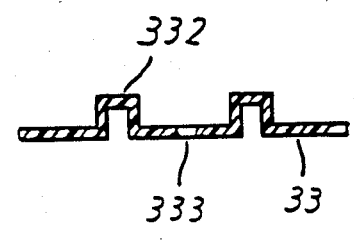
FIG. 5 is a sectional view of a lamp cover member taken along line IV—IV in FIG. 4.

In the embodiment of FIG. 4, transparent plate 33 has slits or openings 333. Each slit 333 has a funnel shape which widens upwardly, as shown in FIG. 5. The slit serves to prevent light from one of the adjacent lamp covers from transmitting to or leaking to the other lamp cover.

Figure 6:
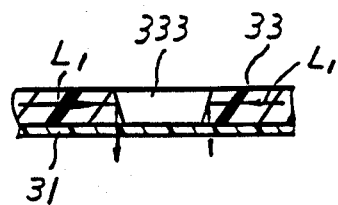
FIG. 6 is an enlarged sectional view of a slit portion of the lamp cover member.

Referring to FIG. 6, light $L_1$ transmitting through transparent plate 33 is reflected downwardly at the inclined side surface of slit 333 and is not transferred beyond the slit.

Accordingly, when one key is operated and when the corresponding one of light emission diode tips 32 is luminous, the luminous light is scattered through the corresponding lamp cover 332 and is emitted through the indicator window of the key. Then, the light is also transmitted in the transparent plate but the transmission is blocked by adjacent slit 333 so that light leaks from the indicator window of the adjacent key are prevented.

In the above-mentioned embodiments, the indicator window is provided in each key. However, the indicator window can be formed in the housing plate at a position adjacent the key.

Figure 7:
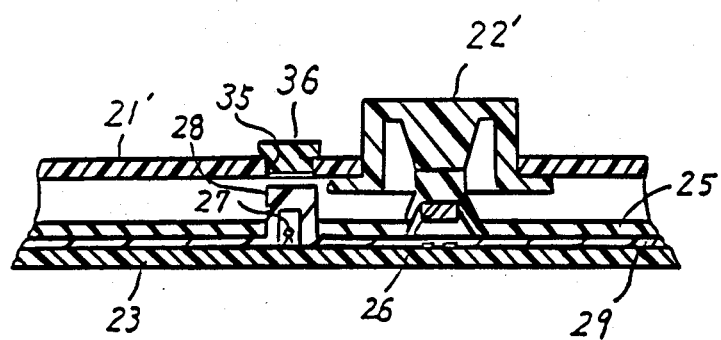
FIG. 7 is a sectional view of a maim portion of another embodiment of the present invention.

Referring to FIG. 7, an indicator window 35 is formed in housing plate 21' adjacent key 22'. The window is closed by a transparent cover 36. Accordingly, lamp cover 28 and light emission diode tip 27 are located under the window.

What is claimed is:

1. In a key switch device with an indicator lamp means which includes a housing plate, at least one key slidably fitted into an opening in said housing plate, supporting means for elastically supporting said key, an electric circuit board fixedly disposed inside said housing plate and having an upper surface with a pair of fixed contacts thereon, an indicator means mounted on the circuit board in the vicinity of said fixed contacts, and a movable contact coupled to said key for coming into contact with said pair of fixed contacts when said key is pushed down, the improvement wherein said indicator means comprises a light emission diode tip, said light emission diode tip being mounted on said electric circuit board and electrically connected to the electric circuit on said electric circuit board, lamp cover means mounted on said electric circuit board for covering said light emission diode tip, said lamp cover means being formed of a light transparent material, said housing plate including a plurality of said keys and respectively for said keys, a plurality of sets of said supporting means, a plurality of said movable contacts, a plurality of said pairs of fixed contacts, a plurality of said light emission diode tips and a plurality of said lamp cover means, said plurality of light emission diode tips and said plurality of fixed contact pairs being commonly mounted on said circuit board, a light transparent plate overlying said circuit board, said transparent plate being provided with a plurality of hollow projections to form said plurality of lamp cover means, said transparent plate also being provided with a plurality of openings exposing said plurality of fixed contact pairs.

2. The key switch device as claimed in claim 1, wherein each said light emission diode tip is disposed under the respective said key, and said key is provided with an indicator window for said light emission diode tip.

3. The key switch device as claimed in claim 1, wherein said housing plate is provided with an indicator window in the vicinity of each said key, and each said light emission diode tip is disposed under said indicator window.

4. The key switch device as claimed in claim 1, wherein said light transparent plate is formed with a plurality of slits at positions between adjacent hollow projections, each slit being of funnel shape which widens upwardly.

* * * * *